US008746382B2

(12) United States Patent
Wai et al.

(10) Patent No.: US 8,746,382 B2
(45) Date of Patent: Jun. 10, 2014

(54) SWITCHED RELUCTANCE GENERATOR PRIMING STRATEGY

(75) Inventors: Jackson Wai, Dunlap, IL (US); Thuong Le, Edwards, IL (US); Timothy Goldammer, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 651 days.

(21) Appl. No.: 12/977,952

(22) Filed: Dec. 23, 2010

(65) Prior Publication Data

US 2012/0161452 A1 Jun. 28, 2012

(51) Int. Cl.
*B60W 10/06* (2006.01)
*B60K 6/448* (2007.10)

(52) U.S. Cl.
USPC .................................... 180/65.28; 180/65.24

(58) Field of Classification Search
USPC .................... 180/65.21, 65.28, 65.285, 65.29
See application file for complete search history.

(56) References Cited

U.S. PATENT DOCUMENTS 1,734,931 A * 11/1929 Webb et al. ..................... 290/17
3,121,836 A * 2/1964 Rosenberry ..................... 322/24
4,520,272 A * 5/1985 Danno et al. ................ 290/40 A
6,011,377 A 1/2000 Heglund et al.
6,404,163 B1 * 6/2002 Kapsokavathis et al. ..... 320/104
6,435,294 B1 * 8/2002 Hara et al. ................. 180/65.25
6,661,206 B2 12/2003 Gallegos-Lopez
6,700,802 B2 3/2004 Ulinski et al.
7,495,411 B2 2/2009 Kaneko et al.
2002/0051368 A1 * 5/2002 Ulinski et al. .................... 363/1
2005/0096804 A1 * 5/2005 Gee et al. ........................ 701/22
2006/0116797 A1 * 6/2006 Moran ............................ 701/22
2007/0023210 A1 2/2007 Bernardi et al.
2007/0045259 A1 3/2007 Beeson et al.
2007/0080236 A1 * 4/2007 Betz et al. .................... 237/12.1
2009/0001911 A1 1/2009 Kayikei et al.
2009/0140574 A1 6/2009 Gorman et al.
2010/0106343 A1 4/2010 Donnelly et al.
2010/0207457 A1 8/2010 Reinkens
2010/0280712 A1 * 11/2010 Bowman ......................... 701/36

* cited by examiner

*Primary Examiner* — J. Allen Shriver, II
*Assistant Examiner* — Bridget Avery
(74) *Attorney, Agent, or Firm* — Miller, Matthias & Hull

(57) ABSTRACT

A method of priming a common bus of a machine having an engine, a generator and an auxiliary power source is provided. The method may determine an operational state of the auxiliary power source, operate the engine at a predetermined idle speed if the auxiliary power source is determined to be inoperative, and enable the generator to regulate the common bus in response to the predetermined idle speed of the engine.

9 Claims, 3 Drawing Sheets

SWITCHED RELUCTANCE GENERATOR PRIMING STRATEGY

TECHNICAL FIELD

The present disclosure relates generally to electric drive assemblies and machines, and more particularly, to systems and methods for regulating the common buses of electric drive assemblies and machines.

BACKGROUND

A common or electrical bus is used in a variety of applications including work machines, vehicles and computers. Electrical buses may also be used in high voltage applications to deliver power from a power source to the electrical devices. An electrical bus is essentially a parallel circuit that is used to connect a plurality of electrical devices together with a power source including generators, solar cells, batteries, or the like. Moreover, electrical buses may be used in direct current (DC) applications and have a positive line and a negative line, or ground line, over which a potential voltage difference may be provided.

As the electrical devices and subcomponents of an electric drive machine rely on the common bus for power, it is essential to regulate or maintain the bus voltage throughout operation of the machine for proper functionality. It is well known that a generator, such as a switched reluctance (SR) generator driven at relatively low engine idle speeds, may be used to regulate the common bus voltage during normal operations of the associated machine. However, it is also well known that such a generator cannot be used to regulate the voltage across a common bus without first priming the common bus or providing a startup voltage thereto. For instance, if the bus voltage has been substantially discharged and/or is less than the minimum startup voltage required for priming the generator, the generator may be unable to turn and begin regulating the bus voltage upon the next startup without additional help.

Accordingly, typical high voltage electric drive machines are provided with an auxiliary voltage source, such as an accessory power converter, configured to prime the common bus and the generator during startup. For example, once the engine of the machine is started by an operator, the accessory power converter is also started to charge the common bus and generator to the minimal startup voltage required. Once the engine idle speed settles to a relatively low idle speed and stabilizes, a request may be submitted to the generator to begin regulating the common bus to an optimum bus voltage. As the common bus and generator have already been primed or charged by the accessory power converter, the generator may begin regulating the bus voltage as soon as the request is received. Once the common bus voltage has been regulated, the operator may be enabled to change the throttle position, engage the engine into a relatively high idle speed and commence normal operations of the machine.

Although such priming strategies may be adequate for most purposes, a significant problem may arise if the accessory power converter, or auxiliary voltage source, malfunctions. For instance, if the auxiliary voltage source fails to prime the common bus or generator during startup of a high voltage electric drive machine, the common bus may not have the minimum charge that is required to start the associated SR generator. Moreover, without a properly primed common bus, the SR generator may be unable to regulate the common bus to the appropriate bus voltage and/or distribute the proper DC voltage to the electrical devices of the machine that are connected to the common bus.

The disclosed system and method is directed at overcoming one or more of the problems set forth above.

SUMMARY OF THE DISCLOSURE

In one aspect of the present disclosure, a method of regulating a common bus of a machine having an engine, a generator and an auxiliary power source is provided. The method determines an operational state of the auxiliary power source, operates the engine at a predetermined idle speed if the auxiliary power source is determined to be inoperative, and enables the generator to regulate the common bus in response to the predetermined idle speed of the engine.

In another aspect of the disclosure, a primer system for a machine is provided. The primer system includes a common bus, a generator and a controller. The generator coupled to the common bus and an engine of the machine. The generator is further configured to supply electrical current to the common bus. The controller is operatively coupled to the engine and configured to selectively operate the engine at a high idle speed so as to prime the common bus and enable the generator.

In yet another aspect of the disclosure, a primer system for a machine is provided. The primer system includes a common bus, a generator coupled to the common bus and an engine of the machine, an auxiliary power source and a controller. The generator is configured to supply electrical current to the common bus. The auxiliary power source is configured to charge the common bus at startup. The controller is operatively coupled to the engine and configured to detect an operational state of the auxiliary power source. If the auxiliary power source is determined to be inoperative, the controller operates the engine at a predetermined idle speed.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
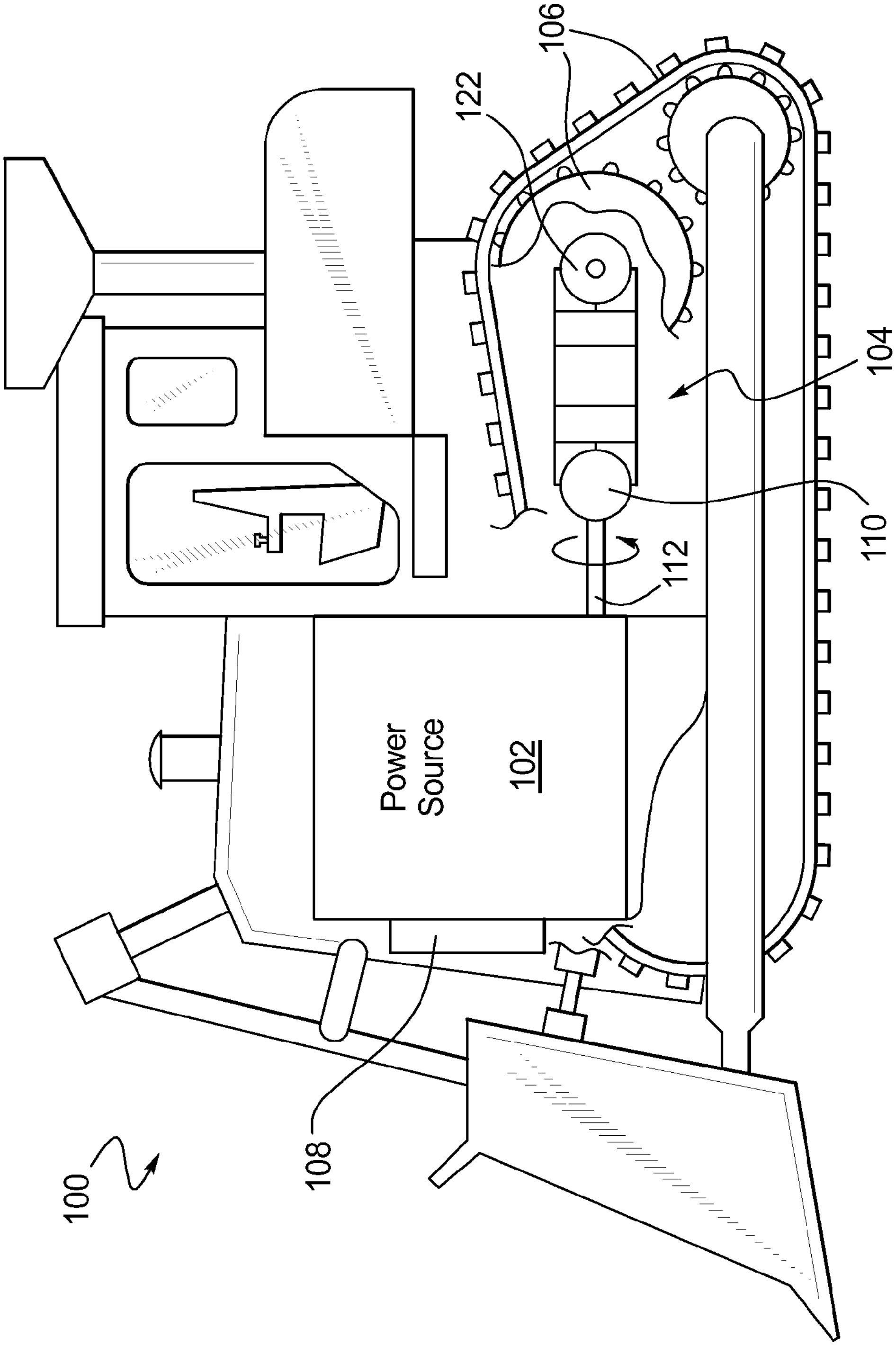
FIG. 1 is a diagrammatic view of a machine constructed in accordance with an exemplary embodiment of the present disclosure.

FIG. 1 diagrammatically illustrates a mobile machine 100 that may employ electric drive means for causing movement. More specifically, the machine 100 may include a primary power source 102 that is coupled to an electric drive 104 for causing movement via a traction device 106. Such a mobile machine 100 may be used as a work machine for performing a particular type of operation associated with an industry, such as mining, construction, farming, transportation, or any other suitable industry known in the art. For example, the machine 100 may be an earth moving machine, a marine vessel, an aircraft, a tractor, an off-road truck, an on-highway passenger vehicle, or any other suitable mobile machine.

Figure 2:
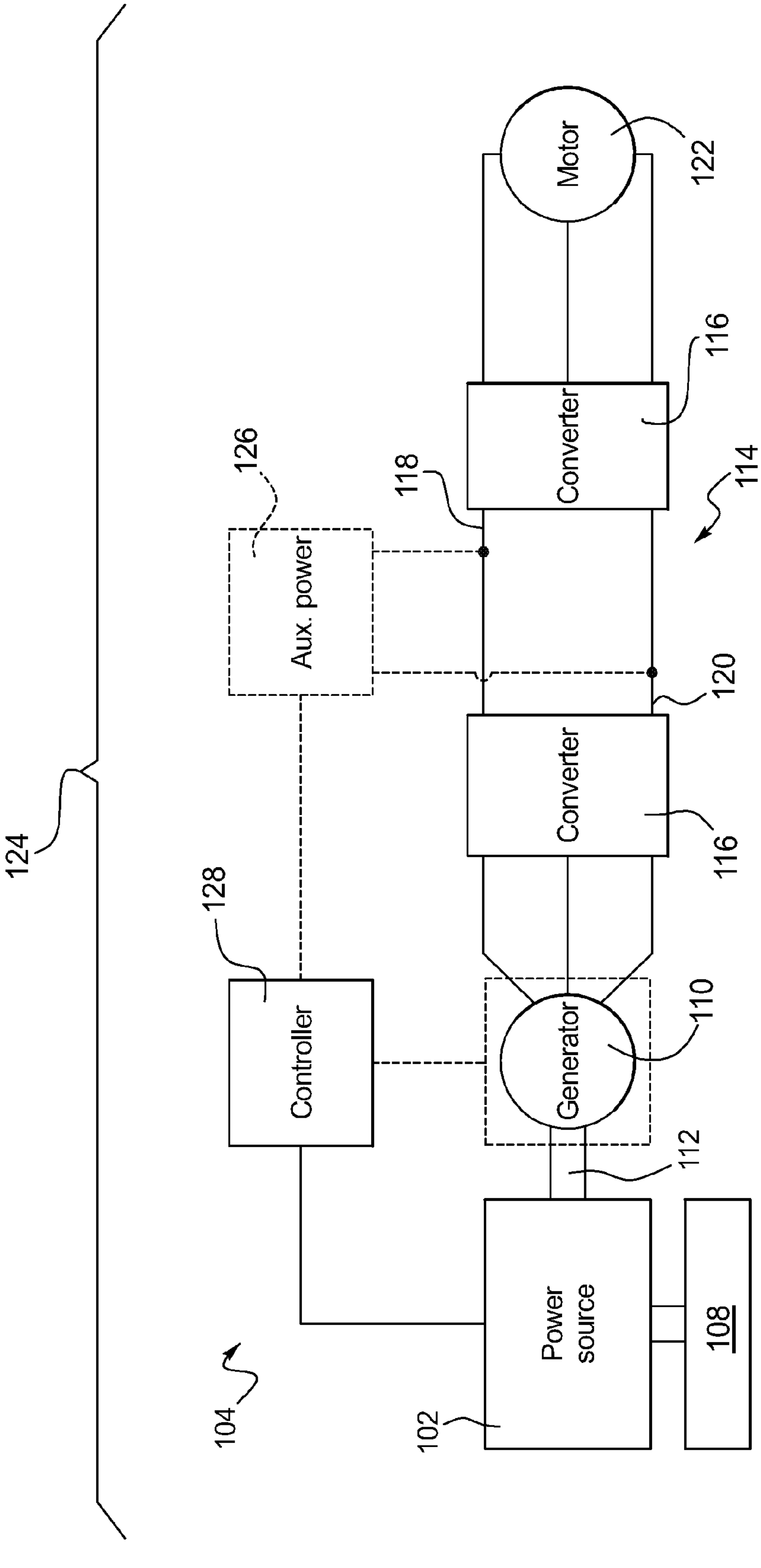
FIG. 2 is a schematic view of an exemplary embodiment of a primer system as applied to a typical electric drive machine.

As further shown in FIG. 2, the primary power source 102 of the electric drive 104 may include, for example, a diesel engine, a gasoline engine, a natural gas engine, or any other type of combustion engine commonly used for generating power. The electric drive 104 may also be used in conjunction with any other suitable source of power such as, for example, a fuel cell, or the like. The engine 102 may be configured to directly or indirectly transmit power to parasitic loads 108 via belts, hydraulic systems, and the like. The engine 102 may also be configured to mechanically transmit power to a generator 110 via a coupling or axially rotating drive shaft 112.

The generator 110 of FIG. 2 may be a switched reluctance (SR) generator, or any other suitable generator configured to produce electrical power in response to rotational input from the engine 102. As is well known in the art, the generator 110 may include a rotor (not shown) that is rotatably disposed within a fixed stator (not shown). The rotor of the generator 110 may be rotatably coupled to an output of the engine 102 via a direct crankshaft, a gear train, a hydraulic circuit, or the like. The stator of the generator 110 may be coupled to a common bus 114 of the electric drive 104 via a converter circuit 116 having rectifiers, inverters, capacitors, and the like. During a generating mode of operation, as the rotor of the generator 110 is rotated within the stator by the primary power source 102, electrical current may be induced within the stator and supplied to the converter circuit 116. The converter circuit 116 may convert the electrical signals into the appropriate direct current (DC) voltage for distribution to the various electrical devices and subcomponents of the machine 100. Additionally, the generator 110 may be enabled to cause rotation of the rotor in response to electrical signals that are provided to the stator from the common bus 114, for instance, during a motoring mode of operation.

The common bus 114 may provide a positive line 118 and a negative or ground line 120 across which the common bus 114 may communicate a common DC bus voltage between one or more electrically parallel devices or subcomponents of the machine 100. For instance, the common bus 114 may communicate power supplied by the engine 102 and the generator 110 to one or more motors 122 for causing motion via a traction device 106. Specifically, the first converter circuit 116 associated with the generator 110 may provide a DC signal to be transmitted to a second converter circuit 116 associated with one or more motors 122. The second converter circuit 116 may convert the DC signal into the appropriated phased signals necessary for driving the motors 122. The common bus 114 may also communicate the common DC voltage to other components of the machine 100, such as power storage devices (not shown), accessory power loads (not shown), or the like. Additionally or optionally, the common bus 114 may be configured such that power supplied by a secondary power source, such as a power storage device, may be communicated to the generator 110 and/or the one or more motors 122. Furthermore, the DC voltage across the common bus 114 may be a substantially high DC voltage which can be conditioned or converted to lower voltages as required by any of the connected components or subcomponents of the machine 100.

Still referring to FIG. 2, the electric drive 104 of the machine 100 may also be provided with an exemplary primer system 124 configured to prime the common bus 114 with a minimum startup voltage and facilitate generator-enabled regulation thereof. More specifically, the primer system 124 of FIG. 2 may include an auxiliary power source 126 configured to charge the generator 110 with a startup voltage during startup of the engine 102, as well as a controller 128 for managing the overall operation of the primer system 124. The auxiliary power source 126 may be in electrical communication with the common bus 114 and the controller 128. In addition to the auxiliary power source 126, the controller 128 may also be in electrical communication with the engine 102, or other primary power source, and the generator 110. In alternative embodiments, the auxiliary power source 126 may be omitted and the primer system 124 may rely solely on the controller 128 to enable the engine 102 and/or generator 110 to prime and regulate the common bus 110 during startup.

The auxiliary power source 126 may include an auxiliary DC voltage source, or the like, configured to automatically charge the common bus 114 to the minimum startup voltage during the ignition of the engine 102. Once the common bus 114 has been sufficiently primed, the auxiliary power source 126 may be powered off while the engine 102 is operated at a relatively low idle speed. Upon stabilization of the low engine idle speed, the generator 110 may begin regulating the common bus 114 at an optimum bus voltage. In particular, once the low engine idle speed stabilizes, a priming request may be transmitted from the controller 128 to the engine 102 and/or generator 110 to begin regulating the common bus 114 to a predefined bus voltage in response to the low engine idle speed. While the bus voltage is regulated by the generator 110, an operator may commence normal operations of the machine 100 by changing the throttle position and engaging the engine into a relatively high idle speed, or the like.

Operations of the primer system 124 may be embedded or integrated into the existing controls of the machine 100. Moreover, the controller 128 may be implemented using one or more of a processor, a microprocessor, a microcontroller, an electronic control module (ECM), an electronic control unit (ECU), or any other suitable means for electronically controlling functionality of the primer system 124. The controller 128 may be configured to operate according to a predetermined algorithm or set of instructions for controlling the primer system 124 based on the operating conditions of the machine 100. Such an algorithm or set of instructions may be preprogrammed or incorporated into a memory of the controller 128 as is commonly used in the art.

Figure 3:
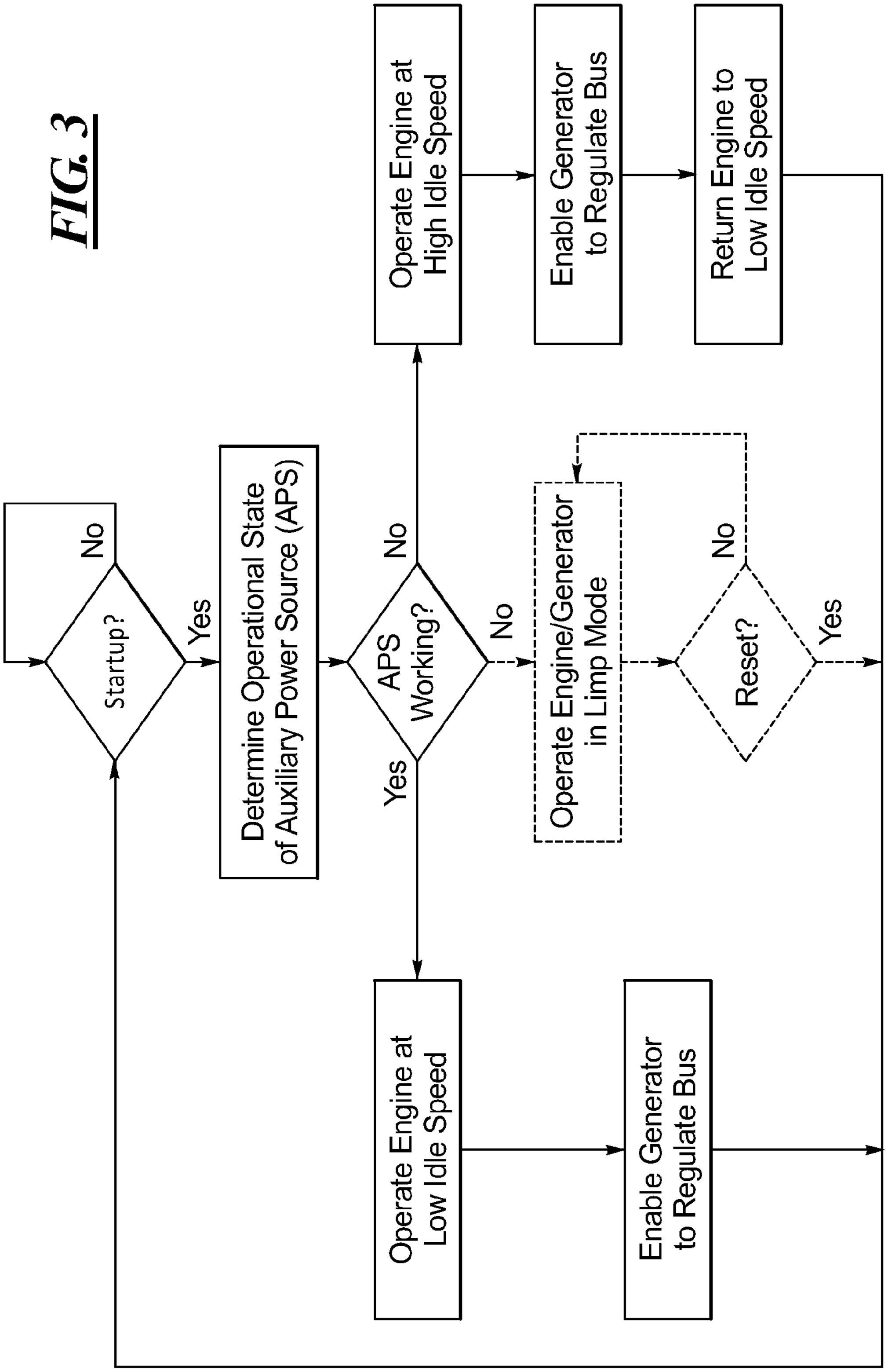
FIG. 3 is a flow diagram of an exemplary method of regulating an electrical common bus of a machine.

As shown in FIG. 3, an exemplary method for regulating a common bus 114 of a machine 100 may include a plurality of conditional steps that are selectively performed based on the operational state of the auxiliary power source 126 and/or the engine 102 of the electric drive 104. Furthermore, the method disclosed may be implemented as an algorithm or a set of program codes by which the controller 128 is configured to operate. As shown, the controller 128 may initially determine if there is a request to startup the machine 100. Indications of such a startup request may correspond to the physical turning or switching of a key by an operator of the machine 100, or the like. If there is a startup request, the controller 128 may determine an operational state of the auxiliary power source 126. The controller 128 may determine the operational state of the auxiliary power source 126, for example, using switches disposed at the auxiliary power source 126, sampling a current at an output of the auxiliary power source 126, monitoring the common bus 114 for a minimal startup voltage, or any other suitable means.

If the auxiliary power source 126 is determined to be operational and once the common bus 114 has been sufficiently charged, the controller 128 may operate the engine 102 at a relatively low idle speed and enable the generator 110 to operate in response to the idling engine 102. Moreover, the controller 128 may monitor the engine idle speed for stabilization, and once stabilized, the controller 128 may enable the generator 110 to regulate the common bus 114 at an optimum bus voltage. The bus voltage may then be distributed to the various electrical devices and subcomponents of the machine 100 requiring DC power. Furthermore, as the generator 110 regulates the common bus 114, an operator may adjust the throttle position of the engine 102 as desired and perform the required operations of the machine 100. As shown in FIG. 3, the controller 128 of the primer system 124 may then enter a standby mode of operation and monitor for any subsequent startup requests.

Alternatively, if the auxiliary power source 126 is determined to be inoperative, the controller 128 may temporarily operate the engine 102 at a relatively high idle speed in order to provide the generator 110 with the startup voltage it requires to begin regulating the common bus 114. More specifically, the high idle speed of the engine 102 may result in a residual voltage that can be used to prime the common bus 114 and enable the generator 110 to begin regulating the bus voltage. The high engine idle speed may be a predetermined value that is stored in the controller 128 and configured to supply the common bus 114 with enough startup voltage for starting the generator 110. The controller 128 may alternatively determine the appropriate idle speed based on the immediate operating conditions of the engine 102 and/or the machine 100. Once the generator 110 has been started and the bus voltage is regulated, the controller 128 may return the engine 102 to low or normal idle speeds and resume normal operations of the machine 100. The controller 128 of the primer system 124 may then return to a standby mode to monitor for subsequent startup requests.

In still further alternatives, the controller 128 of the primer system 124 may instead proceed to place the machine 100 into a limp mode of operation if the auxiliary power source 126 is determined to be inoperative, as illustrated in phantom lines in FIG. 3. Moreover, the controller 128 may limit the operations of the engine 102 and/or the generator 110 of the machine 100 so as to enable only critical components of the machine 100 to operate until the limp mode is reset or cleared by a technician, or the like. For example, during limp mode, the engine 102 may be limited to a lowered maximum rotational speed to minimally enable the machine 100 to be moved or driven to the appropriate facilities for further inspection and/or repair. All other non-critical devices, subcomponents, work tools, and the like, may be disabled during the limp mode. Once the auxiliary power source 126 has been repaired and the limp mode state is cleared or reset, the controller 128 may return to a standby mode of operation and monitor for subsequent startup requests.

INDUSTRIAL APPLICABILITY

In general, the foregoing disclosure finds utility in various industrial applications, such as the farming, construction and mining industries in providing a more robust electrical bus priming strategy for work vehicles and/or machines, such as tractors, backhoe loaders, compactors, feller bunchers, forest machines, industrial loaders, skid steer loaders, wheel loaders, and the like. More specifically, the disclosed priming strategy may be applied to high voltage electric drive machines with switched reluctance generators or other comparable generators commonly used in the art. The systems and methods disclosed herein monitor the ability of an auxiliary power source to prime the common bus and start the associated generator during startup. If the auxiliary power source is determined to be inoperative, the engine is engaged at a relatively high idle speed in order to prime the common bus and enable the generator to regulate the bus voltage. As the work machine can be started and remain fully operational even in the event of a failing auxiliary power source, the down time typically associated with a failed auxiliary power source is significantly reduced.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of regulating a common bus of a machine having an engine, a generator and an auxiliary power source, the method comprising:
- charging the common bus at startup;
- determining an operational state of the auxiliary power source;
- operating the engine at a high idle speed if the auxiliary power source is determined to be inoperative; and
- enabling the generator to regulate the common bus in response to the high idle speed of the engine.

2. The method of claim 1, wherein the operational state of the auxiliary power source is determined during a startup of the engine.

3. The method of claim 1, wherein the generator is a switched reluctance generator.

4. The method of claim 1, further comprising a step of operating the engine at a second predetermined idle speed once the common bus has been sufficiently primed.

5. The method of claim 4, wherein the second predetermined idle speed corresponds to a substantially low idle speed of the engine.

6. A primer system for a machine, comprising:
- a common bus;
- an auxiliary power source configured to charge the common bus at startup;
- a generator coupled to the common bus and an engine of the machine, the generator configured to supply electrical current to the common bus; and
- a controller operatively coupled to the engine and configured to detect an operational state of the auxiliary power source and selectively operate the engine at a high idle speed so as to prime the common bus and enable the generator if the auxiliary power source is determined to be inoperative.

7. The system of claim 6, wherein the high idle speed is determined based on one or more immediate operating conditions of the machine.

8. The system of claim 6, wherein the controller is further configured to return the engine to a low idle speed once the common bus has been sufficiently primed.

9. The system of claim 6, wherein the generator is a switched reluctance generator.

* * * * *